US008643874B2

(12) United States Patent
Goetz et al.

(10) Patent No.: US 8,643,874 B2
(45) Date of Patent: Feb. 4, 2014

(54) METHOD AND SYSTEM FOR GENERATING A WORKFLOW TO PRODUCE A DIMENSIONAL DOCUMENT

(75) Inventors: Frank Michael Goetz, Fairport, NY (US); Lee Coy Moore, Penfield, NY (US); Meera Sampath, Rochester, NY (US); Naveen Sharma, Fariport, NY (US)

(73) Assignee: Xerox Corporation, Norwalk, CT (US)

( * ) Notice: Subject to any disclaimer, the term of this patent is extended or adjusted under 35 U.S.C. 154(b) by 1082 days.

(21) Appl. No.: 12/642,397

(22) Filed: Dec. 18, 2009

(65) Prior Publication Data

US 2011/0149337 A1 Jun. 23, 2011

(51) Int. Cl.
*G06F 3/12* (2006.01)
(52) U.S. Cl.
USPC .......................................... 358/1.15
(58) Field of Classification Search
None
See application file for complete search history.

(56) References Cited

U.S. PATENT DOCUMENTS

| | | | |
|---|---|---|---|
| 3,902,655 A | 9/1975 | Huffman | |
| 5,235,519 A | 8/1993 | Miura | |
| 5,291,583 A | 3/1994 | Bapat | |
| 5,353,390 A | 10/1994 | Harrington | |
| 5,364,017 A * | 11/1994 | Bennett | 229/107 |
| 5,454,644 A * | 10/1995 | Augustin | 383/120 |
| 5,457,904 A | 10/1995 | Colvin | |
| 5,513,117 A | 4/1996 | Small | |
| 5,518,574 A | 5/1996 | Yates et al. | |
| 5,528,517 A | 6/1996 | Løken | |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |
| 5,923,556 A | 7/1999 | Harris | |
| 6,005,959 A | 12/1999 | Mohan et al. | |
| 6,090,027 A | 7/2000 | Brinkman | |

(Continued)

FOREIGN PATENT DOCUMENTS

| | | |
|---|---|---|
| WO | 2005000681 A2 | 1/2005 |
| WO | 2005054983 A2 | 6/2005 |
| WO | 2005122079 A2 | 12/2005 |
| WO | WO 2007021920 A2 | 2/2007 |

OTHER PUBLICATIONS

Liang Lu et al., "Folding Cartons with Fixtures: A Motion Planning Approach", IEEE Transactions on Robotics and Automation, vol. 16, No. 4, Aug. 2000.

(Continued)

*Primary Examiner* — Jeremiah Bryar
(74) *Attorney, Agent, or Firm* — Fox Rothschild LLP (57) ABSTRACT

A method and system generate a workflow for the production of a three-dimensional document. A knowledge base contains production rules for several dimensional documents. The production rules relate to a plurality of jobs, i.e., units of work involved in the production of a dimensional document. The rules also identify human and/or mechanical resources required to complete each job. The system receives, from multiple service providers, capability information corresponding to each service provider's available resources. The capability information is associated with the production rules and stored in the knowledge base. When a user selects a dimensional document to be produced, the system selects appropriate production rules for the document, accesses the associated capability information, and automatically generates a workflow for the document. The system distributes various jobs in the workflow among at least two different service providers.

21 Claims, 6 Drawing Sheets

(56) References Cited

U.S. PATENT DOCUMENTS

| | | | |
|---|---|---|---|
| 6,092,054 A | 7/2000 | Tackbary et al. | |
| 6,117,061 A | 9/2000 | Popat et al. | |
| 6,134,018 A | 10/2000 | Dziesietnik et al. | |
| 6,153,039 A | 11/2000 | Jacobsen | |
| 6,237,787 B1 | 5/2001 | Gallo et al. | |
| 6,243,172 B1 | 6/2001 | Gauthier et al. | |
| 6,246,468 B1 | 6/2001 | Dimsdale | |
| 6,332,149 B1 | 12/2001 | Warmus et al. | |
| 6,409,019 B1 | 6/2002 | Hornsby et al. | |
| 6,505,858 B1 | 1/2003 | Kirchmeyer et al. | |
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |
| 6,896,250 B2 | 5/2005 | Hillebrand | |
| 6,939,063 B2 | 9/2005 | Bussell | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,164,490 B2 | 1/2007 | Manico et al. | |
| 7,191,392 B1 | 3/2007 | Coar | |
| 7,197,465 B1 | 3/2007 | Hu et al. | |
| 7,243,303 B2 | 7/2007 | Purvis et al. | |
| 7,293,652 B2 | 11/2007 | Learn et al. | |
| 7,327,362 B2 | 2/2008 | Grau | |
| 7,346,408 B2 | 3/2008 | Van Bael et al. | |
| 7,366,643 B2 | 4/2008 | Verdura et al. | |
| 7,406,194 B2 | 7/2008 | Aizikowitz et al. | |
| 7,647,752 B2 | 1/2010 | Magnell | |
| 7,729,924 B2* | 6/2010 | Setya | 705/1.1 |
| 7,765,469 B2 | 7/2010 | Sembower et al. | |
| 7,788,883 B2 | 9/2010 | Buckley et al. | |
| 7,832,560 B2 | 11/2010 | Tilton | |
| 8,028,501 B2 | 10/2011 | Buckley et al. | |
| 2002/0085001 A1 | 7/2002 | Taylor | |
| 2002/0118874 A1 | 8/2002 | Chung et al. | |
| 2003/0012454 A1 | 1/2003 | Manico et al. | |
| 2003/0035138 A1 | 2/2003 | Schilling | |
| 2003/0052021 A1* | 3/2003 | McKenzie | 206/308.1 |
| 2003/0083763 A1 | 5/2003 | Kiyohara et al. | |
| 2003/0091227 A1 | 5/2003 | Chang et al. | |
| 2003/0098994 A1 | 5/2003 | Tacke | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2005/0005261 A1 | 1/2005 | Severin | |
| 2005/0050052 A1 | 3/2005 | Zimmerman et al. | |
| 2005/0157342 A1 | 7/2005 | Bru | |
| 2005/0249400 A1 | 11/2005 | Fukumoto | |
| 2005/0278614 A1 | 12/2005 | Aizikowitz et al. | |
| 2005/0278621 A1 | 12/2005 | Aizikowitz et al. | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0008584 A1* | 1/2007 | Kawabuchi et al. | 358/1.15 |
| 2007/0041035 A1 | 2/2007 | Sembower et al. | |
| 2007/0042885 A1 | 2/2007 | Rietjens et al. | |
| 2007/0112460 A1 | 5/2007 | Kiselik | |
| 2007/0172986 A1 | 7/2007 | Huang et al. | |
| 2008/0048308 A1 | 2/2008 | Lam | |
| 2008/0077415 A1 | 3/2008 | Shannon et al. | |
| 2008/0255945 A1 | 10/2008 | Percival et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0254322 A1* | 10/2009 | Herman et al. | 703/7 |
| 2009/0282782 A1 | 11/2009 | Walker et al. | |
| 2009/0287632 A1 | 11/2009 | Gombert et al. | |
| 2009/0287717 A1 | 11/2009 | Gombert et al. | |
| 2010/0060909 A1 | 3/2010 | Conescu et al. | |
| 2010/0098319 A1 | 4/2010 | Gombert et al. | |
| 2010/0110479 A1 | 5/2010 | Gombert et al. | |
| 2010/0222908 A1* | 9/2010 | Gombert et al. | 700/98 |
| 2011/0054849 A1 | 3/2011 | Walker et al. | |
| 2011/0116133 A1 | 5/2011 | Walker et al. | |

OTHER PUBLICATIONS

Chen, "A Knowledge Base System for Carton Package Design", GA2008, 11th Generative Art Conference Dec. 2008.

http://www.esko.com/tmp/080606115325/G2558322_Kongsber_tables_us_pdf, Sep. 1, 2009.

* cited by examiner

METHOD AND SYSTEM FOR GENERATING A WORKFLOW TO PRODUCE A DIMENSIONAL DOCUMENT

BACKGROUND

The creation of a dimensional document can be a labor-intensive process. The widespread production of dimensional documents such as pop-out greeting cards, cut-and-fold paper boxes, and other printed substrates that are foldable into three-dimensional structures would increase if barriers to production were reduced. The design of a dimensional document can require a high degree of skill, thus making widespread consumer adoption difficult. On the production side, print shops and other document production facilities cannot easily implement new technologies or train personnel to create and execute workflows that leverage appropriate resources to create a final piece.

In addition, many print shops may not have all equipment needed to complete the production of a dimensional document. Such facilities often need to sub-contract portions of the job to different service providers. Current systems are not able to effectively leverage production resources that may be available in disparate geographic locations.

The embodiments described in this disclosure are directed to the problems described above.

SUMMARY

In an embodiment, a method for forming a dimensional document includes maintaining a dimensional document production system having a processor and a knowledge base. The knowledge base contains production rules for each of a plurality of dimensional documents. The production rules comprise a plurality of jobs and identification of resources required to complete each job. In this embodiment, the method includes receiving, from multiple service providers via a communications network, capability information corresponding to resources that are available to each service provider. The method also includes using the processor to associate the capability information with the production rules and store the associated capability information in the knowledge base. The method also includes receiving a user selection of a dimensional document to be produced, accessing the knowledge base to select the production rules that will be appropriate for the document to be produced, and accessing the associated capability information to automatically generate at least one workflow for the document to be produced. Each workflow includes at least a first job and the identification of a first service provider who will complete the first job, as well as a second job and the identification of a second one service provider who will complete the second job.

The workflow may be executed by communicating the first job to the first service provider and communicating the second job to the second one of the service providers. The method also may include presenting a workflow to the user by selecting, from a set of automatically generated workflows, a workflow subset. In such an embodiment, the selection is based on at least time required, cost, and/or preference for a particular service provider.

The method also may include maintaining an online catalog of dimensional documents for which production rules are stored in the knowledge base. If so, the method may include receiving, from multiple plurality of service providers via the online catalog, capability information for at least one job to be performed in the manufacture of at least one of the dimensional documents. The online catalog also may contain indicia of dimensional documents for which production rules are stored in the knowledge base. If so, the online catalog may include a user interface via which a service provider may register (i) production rules for a new dimensional document into the knowledge base, and (ii) capability information for at least one job to be performed in the manufacture of the new dimensional document.

Optionally, the method also may include determining whether the knowledge base contains capability information for each job in the workflow. For any particular job for which capability information is not available, the method may include soliciting capability information from multiple service providers for completion of the particular job, adding the solicited capability information to the knowledge base, and updating the automatically generated workflow to include capability and service provider information for the particular job. As an additional option, the method may include presenting a set of possible workflows to the user, along with at least one comparable variable associated with each workflow, receiving a user selection of one of the presented plurality of possible workflows, and executing the user-selected workflow by communicating at least one job in the user-selected workflow to a first service provider and communicating at least another job in the user-selected workflow to a second service provider.

In an alternate embodiment, a dimensional document production system includes a processor, a knowledge base, and a processor-readable storage medium. The knowledge base contains production rules for each of a plurality of dimensional documents, wherein the production rules comprise a plurality of jobs and identification of resources required to complete each job. The processor-readable storage medium communicates with the processor; and contains instructions for receiving, from a set of service providers, capability information corresponding to resources that are available to each service provider. The instructions are also for associating the capability information with the production rules, storing the associated capability information in the knowledge base, receiving a user selection of a dimensional document to be produced, selecting from the knowledge base the production rules that will be appropriate for the document to be produced. and accessing the associated capability information to automatically generate at least one workflow for the document to be produced. Each workflow includes at least a first job and a first service provider who will complete the first job, and a second job and a second service provider who will complete the second job. The system also may include a display; a user input; and a housing that holds the display, the user input, and the processor as a kiosk.

BRIEF DESCRIPTION OF THE DRAWINGS

Aspects, features, benefits and advantages of the embodiments described in this document will be apparent with regard to the following description, appended claims, and accompanying drawings where:

DETAILED DESCRIPTION

Before the present methods and systems are described, it is to be understood that this invention is not limited to the particular systems, methodologies or protocols described, as these may vary. The terminology used in this document is for the purpose of describing particular embodiments only, and it is not intended to limit the scope of the present disclosure.

For purposes of the discussion below, the term "assembly device" refers to a machine used to perform an operation on a dimensional document. Exemplary assembly devices include printers, die cutters, collators, creasing or scoring devices, glue application facilities, perforators, inserters, shrink wrappers and the like.

A "dimensional document" refers to a substrate made of paper, cardboard, or other material to which printed material, cut lines, and score lines may be applied. A dimensional document is typically printed as a flat, but with several facets having boundaries formed by cut lines and/or score lines so that the document can be folded along the score lines to provide three-dimensional features.

A "job" refers to a logical unit of work that is to be completed. For example, a job may include one or more instructions and one or more parameters that, when processed, result in an output. In a document production environment, a job may include one or more print jobs from one or more clients. A production system may produce a plurality of jobs. As described below, group of jobs may be distributed among multiple resources to produce a dimensional document.

A "knowledge base" is an electronic repository of searchable data. A knowledge base also may include rules that are used to answer queries posed by a user or by a processor. A knowledge base may refer to a software component, such as, but not limited to, a database or a table. Alternatively, a knowledge base may refer to a hardware component, such as, but not limited to, a tangible storage medium.

A "resource" refers to an element of a document production environment that performs a function. A resource can be an assembly device or manpower. For example, in a document production environment, a human operator may be required to transport an intermediate work product, such as a printed document, between or among resources as part of a job. A resource also may create and/or apply a unique piece of artwork, or a hand-finished element, to a document.

As used in this document and in the appended claims, the singular forms "a," "an," and "the" include the plural reference unless the context clearly dictates otherwise. The term "comprising" means "including, but not limited to." Unless defined otherwise, all technical and scientific terms used herein have the same meanings as commonly understood by one of ordinary skill in the art.

Figure 1:
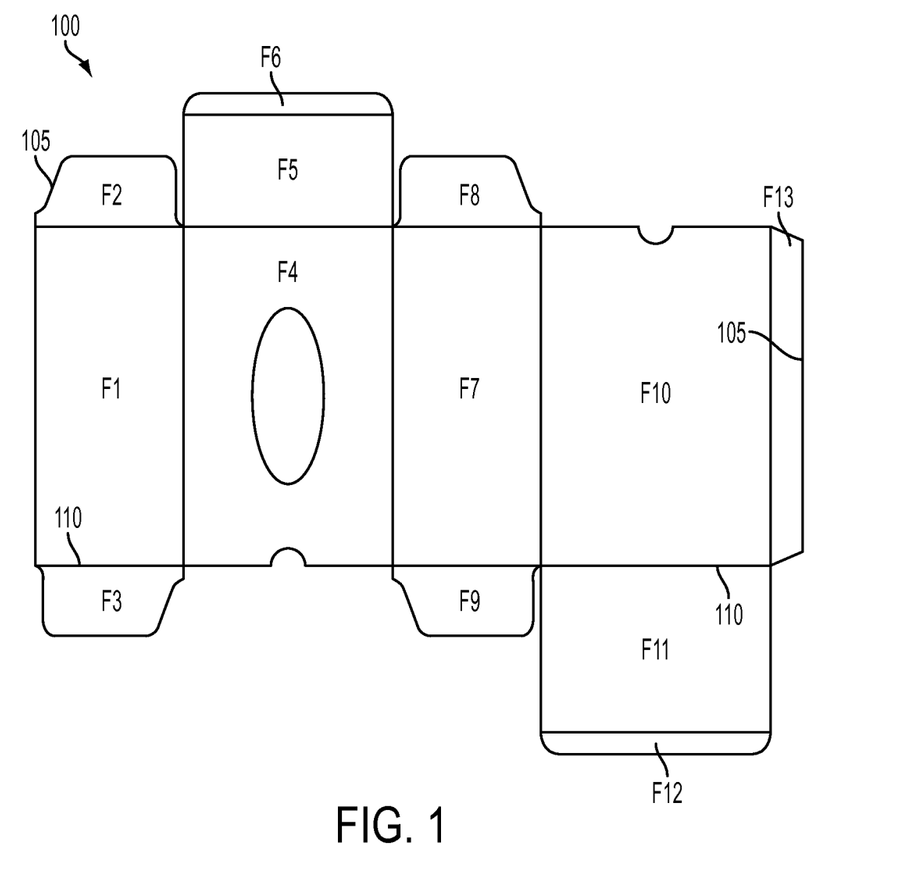
FIG. 1 illustrates an exemplary foldable substrate structure.

FIG. 1 depicts an example of a dimensional document 100 before it is folded into a three-dimensional structure. The substrate may have various facets F1-F12 of varying shapes and sizes. The facets may be separated by fold lines 110 that may be created by scoring or ablating the substrate. The substrate shown may be folded into a three dimensional box having a top facet F4 with opening; a bottom facet F10; side facets F1, F5, F7 and F11; and various flaps F2, F3, F6, F8, F9, F12, F13. Any of the facets may be printed with text, graphics, or other content while the substrate is in two dimensional form. The substrate may be cut along the border lines 105 after printing is complete.

Figure 2:
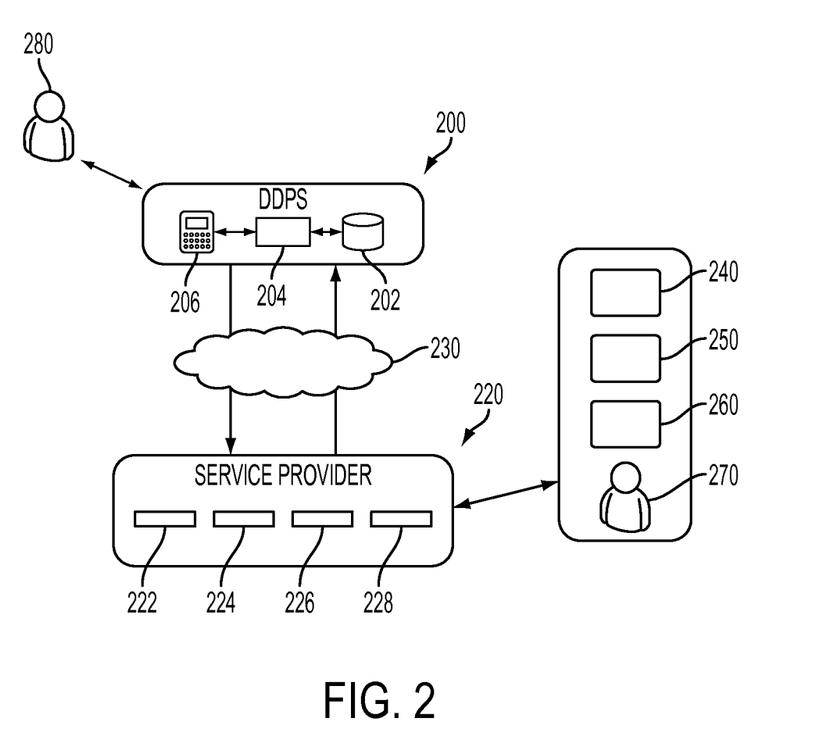
FIG. 2 is a block diagram illustrating how a dimensional document production system may interact with multiple document service providers.

FIG. 2 illustrates how a dimensional document production system (DDPS) 200 may coordinate document assembly according to an embodiment. As shown in FIG. 2, the DDPS 200 may include a computing device that includes a processor 204, a knowledge base 202 and an input device 206. The input device 206 may be integral with or connected to the computing device, as may occur with a keyboard, mouse, touch screen, trackball, touch pad or screen, or similar input device. Alternatively, input device 206 may be simply be a communications port that receives data from a separate device such as a programmable digital assistant, laptop computer, or mobile phone that communicates with the computing device 204 via a network. A customer 280 may communicate with the DDPS via a data entry device such as keyboard, touch screen, trackball, or mouse, or via a remote device that communicates with the DDPS via a network. The customer 280 may input desired structural and print features of a dimensional document.

The DDPS 200 communicates via a communications network 230 with a first dimensional document service provider 220 that houses multiple assembly devices or other resources that perform various actions on a substrate to yield a print job. The service provider 220 may include assembly devices such as a printer 222, cutter 224, and a scoring device 226. The service provider 220 also may include other resources such as a finishing station 228 where machine-implemented or manual activities may occur such as folding, postage metering, or application of delicate items. The DDPS 200 may be housed at the same location as, and optionally integral with, the first service provider 220, in which case the network 230 may be an intranet or simply a system bus or other appropriate system. Alternatively, the DDPS 200 may be a physically separate entity that communicates with the first service provider 220 via a dedicated or public network 230.

The first service provider 220 may exchange assembly device and resource capability information with the DDPS 200. The DDPS may store the information, along with information about additional service providers, in its knowledge base 202. For example, DDPS 200 may store capability information about a second service provider 240 that is capable of embossing a document, a third service provider 250 that is capable of applying paint, a fourth service provider 260 that may apply ribbons or thread, and a fifth service provider 270 that creates and/or applies hand-crafted items such as artwork or sculpture.

Figure 3:
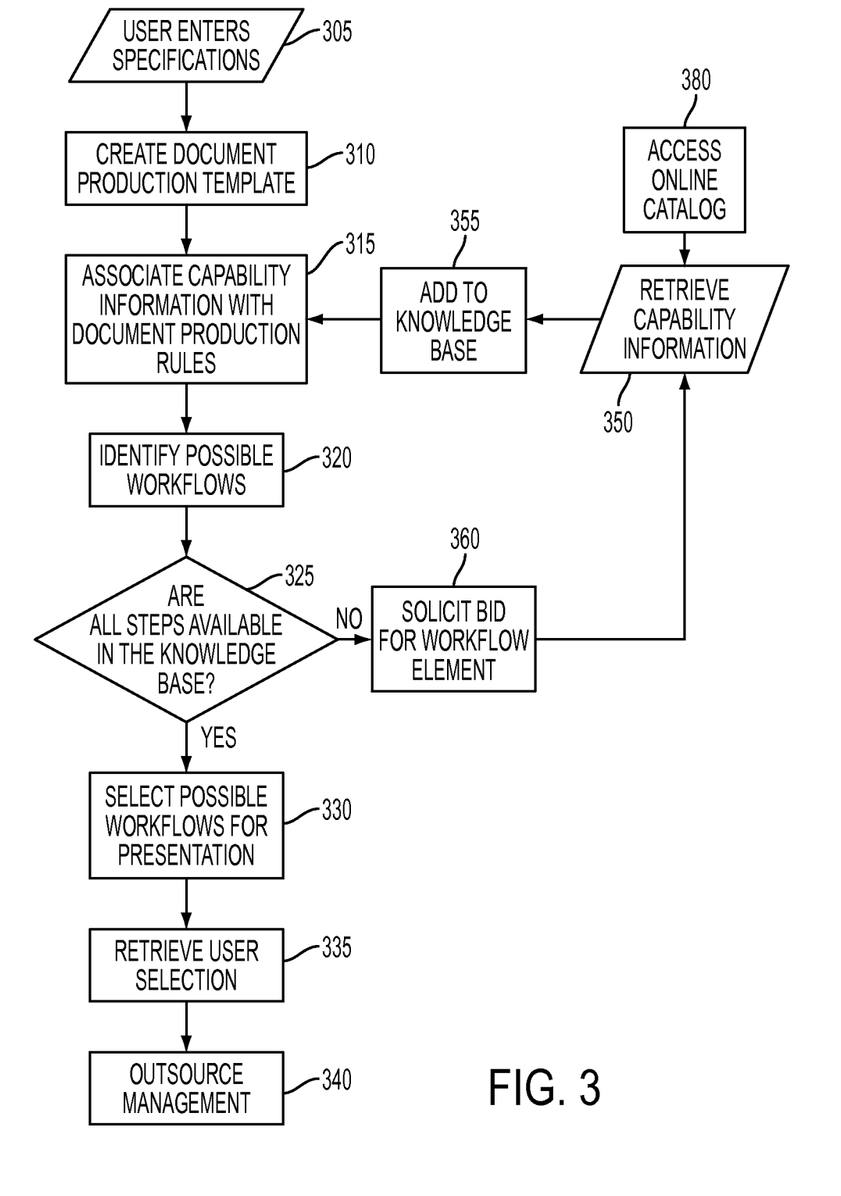
FIG. 3 is a flowchart that illustrates various steps in registering document service provider capabilities and creating associated workflows.

FIG. 3 illustrates exemplary steps in a process of preparing a dimensional document. A user enters specifications for a dimensional document 305. The specifications may be specific selections (such as document type, size, or other structural attributes), or the specifications may be for desired attributes of document, in which case the DDPS may access its knowledge base and infer a document type and structural attributes using a system such as that disclosed in co-pending U.S. Patent Application Publication No. 2009-0287632, the disclosure of which is incorporated herein by reference in its entirety. The specifications also may include printed material (text or graphics) and/or artwork to be added, as well as production and shipping details such as quantity, delivery location, and other information. The specifications may be entered directly into the DDPS. For example, the DDPS may be provided as a kiosk in which a user may select and/or order a dimensional document. If so, the kiosk will include an appropriate housing that holds the processor and either the knowledge base or a communications port that accesses an external knowledge base via a network. The kiosk will include a display and an appropriate user input device. Alternatively, a user may enter specifications on a remote device, and the DDPS may receive the specifications by digital transmission.

The DDPS accesses its knowledge base to populate a document template for production 310. The document template contains production rules for various document attributes. Examples of production rules may include rules specifying a particular type of substrate; rules specifying locations of cut and score lines; instructions for particular graphics to be printed on certain facets of the document; and rules for binding, artwork application, embossing, the application of thread or paint, or other finishing steps.

The rules contained in various document templates may be associated with capability information for various print service providers 315. Capability information for a service provider may include information about the types, capabilities, and interaction style (e.g., manual or automated/programmable) of one or more resources that are available to the service provider. For example, a first service provider may have printing, cutting, scoring, perforating, and sealing machines that may perform associated steps of a document production process in an automated manner. A second service provider may be able to apply embossing to a document, while a third service provider may have artists are available to hand-apply custom craftwork to the document. Multiple service providers may be able to provide one or more services to collectively form a single dimensional document.

Figure 4:
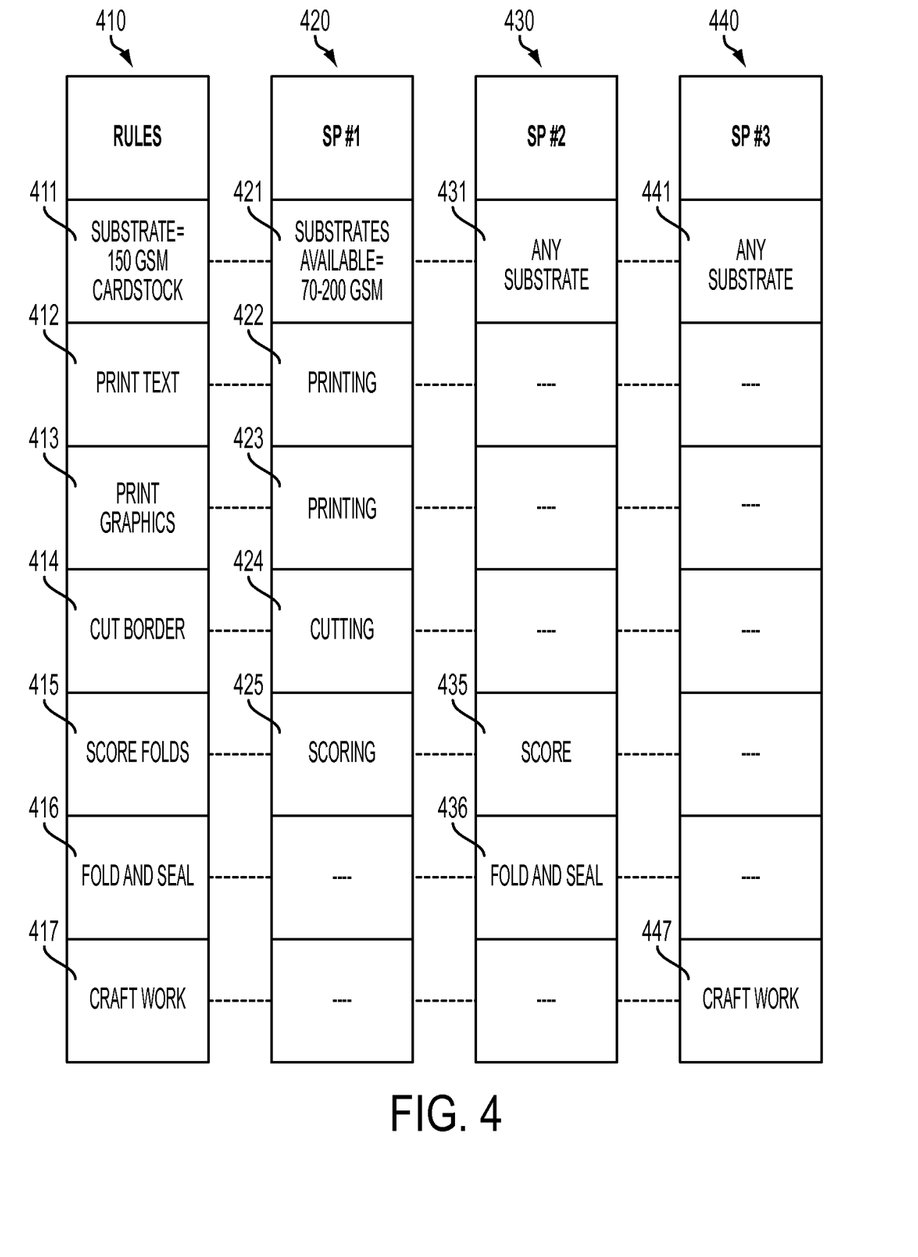
FIG. 4 is a block diagram showing exemplary document production rule set data points and associated service provider capabilities.

The capability data may be associated with document production rules in any appropriate manner. For example, as shown in FIG. 4, a document template 410 may be populated with rules for a particular document. Exemplary rules shown include substrate type 411, print text 412, print graphics 413, cut a border 414, score fold lines 415, fold and seal the substrate 416, and apply craft work 417. Rules capability information for a first service provider (SP#1) may be associated with the rules, such as via a database or table. SP#1's capability information 420 may indicate that SP#1 can work with a range of substrates 421, and can print text 422, print graphics 423, cut 424, and score 425 the substrate. Rules capability information 430 for a second service provider (SP#2) indicates that SP#2 can work with a range of substrates 431, and can score 434, as well as fold and seal 436, the substrate. Rules capability information 440 for a third service provider (SP#3) indicate that SP#3 can work with a range of substrates 441 and has individuals who can hand-apply craftwork 447 to the substrate.

Returning to FIG. 3, the DDPS may retrieve capability information 350 from various service providers and store the capability information in the knowledge base 355. Service providers may provide such information to the DDPS in a variety of ways. In some embodiments, a user interface such as a web site may allow service providers to register with the DDPS and provide capability information about the types, capabilities, and interaction style of the resources available at the service provider's site. Alternatively, an administrator may enter the service provider information into the knowledge base. Optionally, the service provider capability information may including pricing of one or more of the capabilities. The pricing may include data reflecting a charge for using the particular capability. Optionally, the pricing information for any capability may vary depending on related factors, such as volume ordered and whether or not the DDPS requests the service provider to provide one or more other capabilities. Each entry of capability information may be associated 315 with one or more document production rules using an association method such as that shown in FIG. 4. This process of receiving, storing, and associating capability information (steps 350, 355 and 315) will be repeated for multiple service providers.

When the DDPS populates a document template for a desired document, it then accesses its knowledge base to select one or more acceptable workflow plans that comprise a complete print job for the document 320. A workflow plan is a data set identifying those resources and service providers that will be used to perform each of the various steps required to prepare a finished dimensional document. The knowledge base may include an ontology and data set corresponding to service provider resources and document production rules.

For some documents, complete workflow plans including available resources for every step in the document assembly process may not be available in the knowledge base 325. If not, the DDPS may solicit bids 360 from various service providers for providing the service using any appropriate means, such as public advertisements, transmitting messages to registered service providers, or other modes of contact. When the bids and associated capability information are received 350, they are entered into the knowledge base 355 and associated with document production rules 315 as with other capability data.

In other situations, when determining 325 whether all steps are available, the system may find that complete workflow plans including available resources for every step in the document assembly process are available in the knowledge base. If so, the DDPS may select 330 one or more of the possible workflows for presentation to the user. For example, referring to FIG. 4, an appropriate workflow plan to complete the document specified by the production template 410 may include using Service Provider #1 420 for printing text and graphics, cutting, and scoring, using Service Provider #2 430 for folding and sealing, and using Service Provider #3 440 for the application of craft work. An alternate workflow may involving using Service Provider #2 430 instead of Service Provider #1 420 for the scoring. Referring again to FIG. 3, in some embodiments, the selecting 330 may include selecting all possible options for presentation to the user. Alternatively, a single workflow plan or fewer than all possible workflow plans may be selected based on any number of criteria, such as lowest total production cost, fastest production time, least number of service providers, user or administrator preference for specific service providers, or other criteria. Optionally, one or more comparable variables may be presented with the workflow. Comparable variables are funds associated with each workflow, such as cost, time, quality, or other features, that can help the user choose between multiple workflows.

The user may then receive a user selection of a workflow 335, which may be as simple as confirmation of an order or as complex as allowing the user to select the specific service providers that will provide various jobs in the workflow. The system may then manage the workflow 340 by communicating with each of the service providers in the workflow and alerting them as to which job or jobs each will perform.

In some embodiments, the DDPS may provide an catalog interface that is accessible by multiple document service providers, end users, or others. The catalog interface, which may be available via a web portal, kiosk, web browser or a computing or communications device, or other interface with searching and data input capability, may include a catalog of various dimensional document designs for which rules are available. The service provider may access the catalog 380 and enter its capabilities for various resources so that it is registered in the knowledge base as having resources that can complete some or all jobs in the workflow that is associated with the rules. In some embodiments, when accessing the catalog 380 the service provider may offer a particular dimensional document that is not found in the catalog. If so, the service provider may create a rule set for the document, enter its capabilities for each rule in the set, and this creates a new workflow to be stored in the knowledge base and the catalog. An alternate workflow may have Service Provider #2 perform the scoring instead of Service Provider #1. Other service providers may then see one or more of these workflows and may associate their capabilities with the various rules in a workflow.

In addition, a print provider who would like to prepare a certain type of document but lacks a capability for a particular job in its production may use the system's online catalog 380 to identify other service providers who have the capability to perform that function. The print provider may then associate another service provider with its capabilities for outsource management of a particular job.

Figure 5:
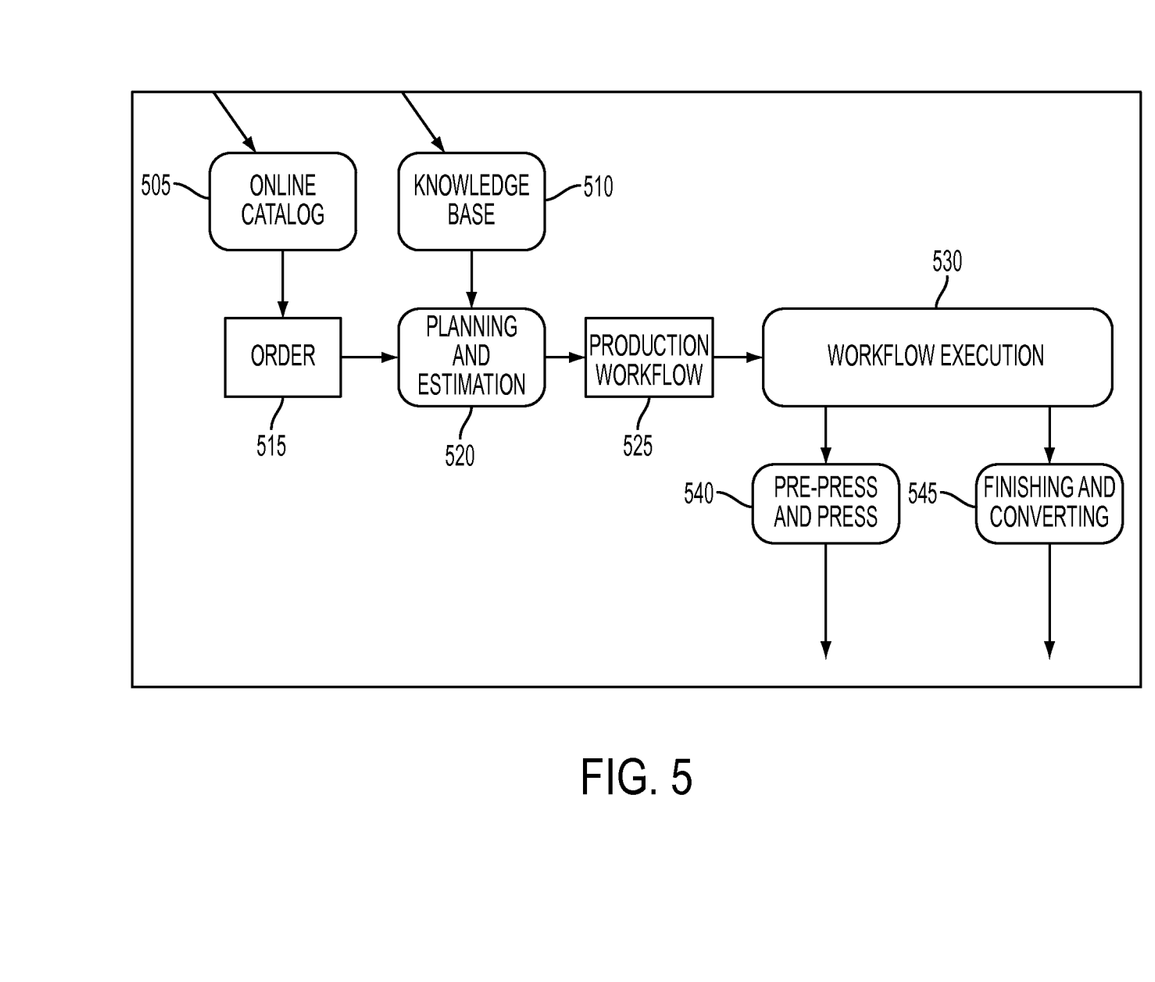
FIG. 5 is a block diagram illustrating exemplary components of a dimensional document production system.

An overview of the various aspects of the DDPS is also provided in FIG. 5. Referring to FIG. 5, the DDPS may include an online catalog 505 of available documents. Customers may use the catalog to place an order 515, or service providers may use the catalog to enter capabilities into the knowledge base 510. When an order 515 is received, a planning and estimation module 520 may access the knowledge base and prepare a production workflow for the order. The workflow includes both: (a) jobs to be completed in the assembly; and (b) for each job, an identification of the service provider who will complete the job. The DDPS may then execute 530 the workflow by assigning various jobs to various service providers, such as pre-press and press operations 540 to a first service provider, as well as finishing and converting operations 545 to a second service provider.

Figure 6:
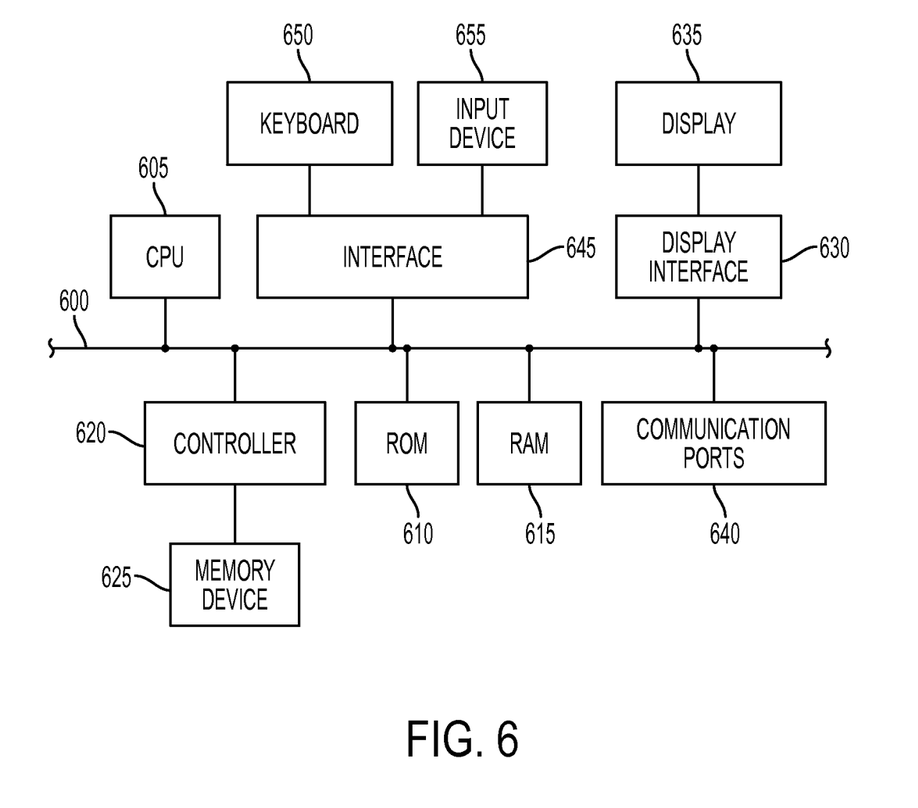
FIG. 6 is a block diagram illustrating exemplary hardware that may be used to contain or implement program instructions.

FIG. 6 depicts a block diagram of exemplary internal hardware that may be used to contain or implement program instructions for the DDPS according to an embodiment. A bus 600 serves as the main information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a compact disk, a digital disk, flash memory, a memory card, a USB drive, an optical disc storage medium such as a Blu-ray™ disc, and/or another recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

An embedded system, such as a sub-system within a xerographic apparatus, may optionally be used to perform one, some or all of the operations described above. Likewise, a multiprocessor system may optionally be used to perform one, some or all of the operations described above.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for forming a dimensional document, comprising:
    maintaining a dimensional document production system comprising a processor and a knowledge base, the knowledge base containing production rules for each of a plurality of dimensional documents, wherein the production rules comprise a plurality of jobs and identification of resources required to complete each job;
    receiving, from a plurality of service providers via a communications network, capability information corresponding to resources that are available to each service provider;
    associating, by the processor, the capability information with the production rules and storing the associated capability information in the knowledge base;
    receiving a user selection of a dimensional document to be produced;
    selecting, by the processor, from the knowledge base, the production rules that will be appropriate for the document to be produced; and
    accessing, by the processor, the associated capability information to automatically generate at least one workflow for the document to be produced, each workflow including at least a first job and a first one of the service providers who will complete the first job, and at least a second job and a second one of the service providers who will complete the second job.

2. The method of claim 1, further comprising executing the at least one workflow by:
    communicating the first job to the first one of the service providers; and
    communicating the second job to the second one of the service providers.

3. The method of claim 1, further comprising:
    presenting the at least one workflow to a user, wherein the presenting further comprises selecting, from a plurality of automatically generated workflows, a workflow subset, wherein the selection is based on at least one at least one of time required, cost, or preference for a particular service provider.

4. The method of claim 1, further comprising:
    maintaining an online catalog of dimensional documents for which production rules are stored in the knowledge base;
    receiving, from each of a plurality of service providers via the online catalog, capability information for at least one job to be performed in the manufacture of at least one of the dimensional documents that is maintained in the online catalog.

5. The method of claim 1, further comprising:
for a selected one or more of the automatically generated workflows, determining whether the knowledge base contains capability information for each job in each selected workflow; and
for any particular job for which capability information is not available:
soliciting capability information from a plurality of service providers for completion of the particular job,
adding the solicited capability information to the knowledge base, and
updating the automatically generated workflow corresponding to the particular job to include capability and service provider information for the particular job.

6. The method of claim 1, further comprising:
presenting a plurality of possible workflows to the user, along with at least one comparable variable associated with each workflow;
receiving a user selection of one of the presented plurality of possible workflows; and
executing the user-selected workflow by communicating at least one job in the user-selected workflow to the first one of the service providers and communicating at least another job in the user-selected workflow to the second one of the service providers.

7. The method of claim 1, further comprising:
maintaining an online catalog of dimensional documents for which production rules are stored in the knowledge base, wherein the online catalog includes a user interface via which a service provider may register production rules for a new dimensional document into the knowledge base; and
receiving, from each of a plurality of service providers, capability information for at least one job to be performed in the manufacture of the new dimensional document.

8. A method of automatically generating a workflow for the production of a dimensional document, comprising:
maintaining a dimensional document production system comprising a processor and a knowledge base, wherein the knowledge base contains production rules for each of a plurality of dimensional documents, wherein the production rules comprise a plurality of jobs and identification of resources required to complete each job;
receiving, from a plurality of service providers via a communications network, capability information corresponding to resources that are available to each service provider;
associating, by the processor, the capability information with the production rules and storing the associated capability information in the knowledge base;
receiving a user selection of a dimensional document to be produced;
selecting, by the processor from the knowledge base, the production rules that will be appropriate for the document to be produced;
accessing, by the processor, the associated capability information to automatically generate at least one workflow for the document to be produced, each workflow including at least a first job and a first one of the service providers who will complete the first job, and at least a second job and a second one of the service providers who will complete the second job; and
executing the at least one workflow by:
communicating the first job to the first one of the service providers; and
communicating the second job to the second one of the service providers.

9. The method of claim 8, further comprising:
maintaining an online catalog of dimensional documents for which production rules are stored in the knowledge base;
receiving, from each of a plurality of service providers via the online catalog, capability information for at least one job to be performed in the manufacture of at least one of the dimensional documents that is maintained in the online catalog.

10. The method of claim 8, further comprising, before the executing:
for a selected one or more of the automatically generated workflows, determining whether the knowledge base contains capability information for each job in each selected workflow; and
for any particular job for which capability information is not available:
soliciting capability information from a plurality of service providers for completion of the particular job,
adding the solicited capability information to the knowledge base, and
updating the automatically generated workflow corresponding to the particular job to include capability and service provider information for the particular job workflow.

11. The method of claim 8, further comprising, before the executing:
presenting a plurality of possible workflows to the user, along with at least one comparable variable associated with each workflow; and
receiving a user selection of one of the presented plurality of possible workflows.

12. The method of claim 8, further comprising:
maintaining an online catalog of dimensional documents for which production rules are stored in the knowledge base, wherein the online catalog includes a user interface via which a service provider may register production rules for a new dimensional document into the knowledge base; and
receiving, from each of a plurality of service providers, capability information for at least one job to be performed in the manufacture of the new dimensional document.

13. The method of claim 8, wherein the first one of the service providers will perform a mechanical operation on the dimensional document, and the second one of the service providers will perform a manual operation on the dimensional document.

14. A dimensional document production system, comprising:
a processor;
a knowledge base containing production rules for each of a plurality of dimensional documents, wherein the production rules comprise a plurality of jobs and identification of resources required to complete each job; and
a processor-readable storage medium in communication with the processor; wherein the processor readable storage medium contains instructions for:
receiving, from a plurality of service providers, capability information corresponding to resources that are available to each service provider;
associating the capability information with the production rules and storing the associated capability information in the knowledge base;

receiving a user selection of a dimensional document to be produced;

selecting, from the knowledge base, the production rules that will be appropriate for the document to be produced; and accessing the associated capability information to automatically generate at least one workflow for the document to be produced, each workflow including at least a first job and a first one of the service providers who will complete the first job, and at least a second job and a second one of the service providers who will complete the second job.

15. The system of claim 14, further comprising:
a display;
a user input; and
a housing that holds the display, the user input, and the processor as a kiosk.

16. The system of claim 14, wherein the processor readable storage medium also contains instructions for executing the at least one workflow by:
communicating the first job to the first one of the service providers; and
communicating the second job to the second one of the service providers.

17. The system of claim 14, wherein the processor readable storage medium also contains instructions for selecting, from a plurality of automatically generated workflows, a workflow subset, wherein the selection is based on at least one at least one of time required, cost, or preference for a particular service provider.

18. The system of claim 14, further comprising:
an online catalog of dimensional documents for which production rules are stored in the knowledge base;
wherein the processor readable storage medium also contains instructions for receiving, from each of a plurality of service providers via the online catalog, capability information for at least one job to be performed in the manufacture of at least of the dimensional documents that is maintained in the online catalog.

19. The system of claim 14, wherein the processor readable storage medium also contains instructions for:

for a selected one or more of the automatically generated workflows, determining whether the knowledge base contains capability information for each job in each selected workflow; and for any particular job for which capability information is not available:
soliciting capability information from a plurality of service providers for completion of the particular job,
adding the solicited capability information to the knowledge base, and
updating the automatically generated workflow corresponding to the particular job to include capability and service provider information for the particular job.

20. The system of claim 14, wherein:
the instructions for the presenting also comprise instructions for presenting a plurality of possible workflows to the user, along with at least one comparable variable associated with each workflow; and
the processor readable storage medium also contains instructions for
receiving a user selection of one of the presented plurality of possible workflows; and
executing the user-selected workflow by communicating at least one job in the user-selected workflow to a first one of the service providers and communicating at least another job in the user-selected workflow to a second one of the service providers.

21. The system of claim 14, further comprising:
an online catalog of dimensional documents for which production rules are stored in the knowledge base, wherein the online catalog includes a user interface via which a service provider may register production rules for a new dimensional document into the knowledge base; and
wherein the processor readable storage medium also contains instructions for receiving, from each of a plurality of service providers, capability information for at least one job to be performed in the manufacture of the new dimensional document.

* * * * *